US012649201B2

(12) United States Patent
Voronov et al.

(10) Patent No.: US 12,649,201 B2
(45) Date of Patent: Jun. 9, 2026

(54) LASER MACHINING DEVICE

(71) Applicant: Samsung Display Co., Ltd., Yongin-si (KR)

(72) Inventors: Alexander Voronov, Suwon-si (KR); Hyungsik Kim, Suwon-si (KR); Junghwa You, Hwaseong-si (KR); Woohyun Jung, Seoul (KR); Kyunghan Yoo, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 782 days.

(21) Appl. No.: 18/071,041

(22) Filed: Nov. 29, 2022

(65) Prior Publication Data

US 2023/0201962 A1     Jun. 29, 2023

(30) Foreign Application Priority Data

Dec. 29, 2021     (KR) ........................ 10-2021-0191221

(51) Int. Cl.
B23K 26/067          (2006.01)
B23K 26/0622        (2014.01)
(Continued)

(52) U.S. Cl.
CPC ...... B23K 26/0676 (2013.01); B23K 26/0624 (2015.10); B23K 26/0648 (2013.01); B23K 26/0652 (2013.01); *B23K 2101/36* (2018.08)

(58) Field of Classification Search
CPC ........ B41J 2/1634; B23K 26/00; B23K 26/06; B23K 26/062; B23K 26/064;
(Continued)

(56) References Cited

U.S. PATENT DOCUMENTS 2,963,937 A * 12/1960 Raitiere ............... G02B 27/106
                                                            352/206
4,782,368 A * 11/1988 Ogawa ...................... G03F 9/70
                                                            355/53
(Continued)

FOREIGN PATENT DOCUMENTS

EP          3147697 A1      3/2017
KR      100862449 B1      10/2008
(Continued)

*Primary Examiner* — Alain Chau
(74) *Attorney, Agent, or Firm* — CANTOR COLBURN LLP

(57) ABSTRACT

A laser machining device includes: a broadband light source, which generates a broadband laser beam; a first lens unit to which the broadband laser beam is incident and having a first effective focal length; a second lens unit spaced apart from the first lens unit in a first direction and having a second effective focal length; a beam splitter disposed between the first lens unit and the second lens unit, and which is movable in the first direction and a direction opposite to the first direction within the first effective focal length from the first lens unit, and splits the broadband laser beam passing through the first lens unit into a plurality of sub-laser beams; and a focusing lens spaced apart from the second lens unit in the first direction, and which focuses the sub-laser beams passing through the second lens unit on a substrate.

19 Claims, 4 Drawing Sheets

(51) Int. Cl.
    *B23K 26/064*      (2014.01)
    *B23K 101/36*     (2006.01)

(58) Field of Classification Search
    CPC ............ B23K 26/0648; B23K 26/0622; B23K
              26/0624; B23K 26/067; B23K 26/0673;
              B23K 26/0676; G02B 27/106; G02B
              27/12; G02B 27/123; G02B 27/126;
                                G02B 27/4233
    See application file for complete search history.

(56)               References Cited

U.S. PATENT DOCUMENTS

| | | | |
|---|---|---|---|
| 6,720,519 B2 | 4/2004 | Liu et al. | |
| 6,975,443 B2* | 12/2005 | Sandstrom | G03F 7/70383 |
| | | | 430/311 |
| 8,023,206 B2 | 9/2011 | Laskin | |
| 9,610,729 B2* | 4/2017 | Sieben | B29C 65/1638 |
| 10,406,630 B1 | 9/2019 | Karlsen | |
| 10,877,243 B2* | 12/2020 | Aslanov | G02B 13/0005 |
| 11,465,235 B2* | 10/2022 | Okuma | B23K 26/352 |
| 11,583,955 B2* | 2/2023 | Jiang | B23K 26/0624 |
| 11,975,405 B2* | 5/2024 | Tzankov | B23K 26/38 |
| 2003/0140806 A1* | 7/2003 | Sandstrom | G02B 26/0816 |
| | | | 101/463.1 |
| 2014/0150953 A1* | 6/2014 | Sieben | B29C 66/952 |
| | | | 156/64 |
| 2019/0187416 A1* | 6/2019 | Aslanov | G02B 27/0031 |
| 2020/0061740 A1* | 2/2020 | Okuma | B23K 26/067 |
| 2020/0289809 A1* | 9/2020 | Iwama | B23K 26/0652 |
| 2021/0039198 A1* | 2/2021 | Jiang | B23K 26/324 |
| 2021/0283722 A1* | 9/2021 | Zeng | B23K 26/0624 |
| 2022/0009036 A1* | 1/2022 | Zhou | B23K 26/0604 |
| 2023/0033718 A1* | 2/2023 | Voisiat | B23K 26/066 |
| 2023/0048420 A1* | 2/2023 | Funck | B23K 26/0676 |
| 2025/0147292 A1* | 5/2025 | Sudo | G02B 27/1006 |

FOREIGN PATENT DOCUMENTS

| | | |
|---|---|---|
| WO | 0053365 A1 | 9/2000 |
| WO | 2011116968 A2 | 9/2011 |

* cited by examiner

FIG. 2

LASER MACHINING DEVICE

This application claims priority to Korean Patent Application No. 10-2021-0191221 filed on Dec. 29, 2021, and all the benefits accruing therefrom under 35 U.S.C. § 119, the content of which in its entirety is herein incorporated by reference.

BACKGROUND

1. Field

Embodiments relate to a laser machining device. More particularly, embodiments relate to the laser machining device which can be used in a field of display.

2. Description of the Related Art

Laser processing technology is applied in various ways, such as forming a groove on a surface of an object to be processed by irradiating a laser to the object, forming a damaged layer inside the object, or changing material properties of the object.

As a trend of high density, high integration, and high precision in a semiconductor and display fields becomes clear, the need for ultra-precision and ultra-fast laser processing technology is expanding. In addition, a pulsed laser capable of obtaining a large instantaneous output is attracting attention to improve laser processability. The pulse duration time of a pulsed laser is gradually shortening from nanoseconds to femtoseconds.

On the other hand, when a laser beam passes through a transmissive lens, chromatic aberration occurs due to a difference in refractive index for each wavelength, so that a position of a focus varies according to the wavelength. The shorter the pulse duration time of the laser beam, the wider the spectral band width tends to be. As the pulse duration time of the laser beam gets shorter, the processing quality deteriorates, defects in the workpiece, low productivity, etc. is caused by the effect of chromatic aberration.

In addition, when a plurality of diffractive lenses is included to correct the chromatic aberration, there is a problem in which a configuration of equipment is complicated and equipment cost is increased.

SUMMARY

Embodiments provide a laser machining device with improved processing quality.

Other embodiments provide a laser machining device with a simplified configuration and reduced equipment cost.

A laser machining device according to an embodiment includes: a broadband light source, which generates a broadband laser beam; a first lens unit to which the broadband laser beam is incident and having a first effective focal length; a second lens unit spaced apart from the first lens unit in a first direction and having a second effective focal length; a beam splitter disposed between the first lens unit and the second lens unit, and which is movable in the first direction and a direction opposite to the first direction within the first effective focal length from the first lens unit, and splits the broadband laser beam passing through the first lens unit into a plurality of sub-laser beams; and a focusing lens spaced apart from the second lens unit in the first direction, and which focuses the sub-laser beams passing through the second lens unit on a substrate.

In an embodiment, a location of each of the first lens unit and the second lens unit may be fixed.

In an embodiment, a length between the first lens unit and the second lens unit may satisfy Equation 1 below:

$$0.9L < f_{eff1} + f_{eff2} < 1.1L. \qquad \text{[Equation 1]}$$

In Equation 1, L is the length between the first lens unit and the second lens unit, $f_{eff1}$ is the first effective focal length, and $f_{eff2}$ is the second effective focal length.

In an embodiment, a pitch between the sub-laser beams focused on the substrate may be adjusted according to movement of the beam splitter in the first direction or the direction opposite to the first direction.

In an embodiment, the pitch may satisfy Equation 2 below:

$$p = f\alpha\left(\frac{L - d}{f_{eff2}} - 1\right). \qquad \text{[Equation 2]}$$

In Equation 2, p is the pitch, f is the focal length of the focusing lens, $\alpha$ is a separation angle of the beam splitter, L is the length between the first lens unit and the second lens unit, and d is a distance between the first lens unit and the beam splitter, and $f_{eff2}$ is the second effective focal length.

In an embodiment, a first chromatic aberration by the beam splitter may be compensated by a second chromatic aberration by a combination of the first lens unit and the second lens unit.

In an embodiment, an Abbe number of the second lens unit may satisfy Equation 3 below:

$$0.8\frac{1}{v_2} < \frac{\delta\lambda_{abbe}}{\lambda_0}\left(1 - \frac{f_{eff2}}{L - d}\right) < 1.2\frac{1}{v_2}. \qquad \text{[Equation 3]}$$

In Equation 3, $V_2$ is the Abbe number of the second lens unit, $\delta\lambda_{abbe}$ a wavelength width of the broadband laser beam, $\lambda_0$ is a center wavelength of the broadband laser beam, $f_{eff2}$ is the second effective focal length, and L is the length between the first lens unit and the second lens unit, and d is the length between the first lens unit and the beam splitter.

In an embodiment, an Abbe number of the first lens unit may satisfy Equation 4 below:

$$-\frac{f_{eff2}}{f_{eff1}}\frac{1}{v_2} < \frac{1}{v_1} < \frac{f_{eff2}}{f_{eff1}}\frac{1}{v_2}. \qquad \text{[Equation 4]}$$

In Equation 4, $V_1$ is the Abbe number of the first lens unit, $V_2$ is the Abbe number of the second lens unit, $f_{eff1}$ is the first effective focal length, and $f_{eff2}$ is the second effective focal length.

In an embodiment, the first lens unit may include one lens having an Abbe number greater than 60.

In an embodiment, the second lens unit may include one lens having an Abbe number greater than 20.

In an embodiment, the second lens unit may include a first lens having a negative refractive power and a second lens having a positive refractive power, and an Abbe number of the first lens may be greater than an Abbe number of the second lens unit.

In an embodiment, the laser machining device may further include a spatial filter disposed between the beam splitter and the second lens unit and having a hole formed in a focal plane of the first lens unit.

In an embodiment, the broadband laser beam may be a femtosecond laser or a picosecond laser.

In an embodiment, a bandwidth of the broadband laser beam may be greater than about 0.1 nanometers (nm).

In an embodiment, a center wavelength of the broadband laser beam may be greater than about 0.193 micrometers (μm) and less than about 10.6 μm.

In an embodiment, the beam splitter may be a 1×N type beam splitter or an N×N type beam splitter, and the sub-laser beams split by the beam splitter may have a uniform intensity.

In an embodiment, the broadband laser beam incident to the first lens unit may be a focused beam.

A laser machining device according to an embodiment includes: a broadband light source, which generates a broadband laser beam; a first lens unit to which the broadband laser beam is incident; a second lens unit spaced apart from the first lens unit in a first direction; a beam splitter disposed between the first lens unit and the second lens unit, and which splits the broadband laser beam passing through the first lens unit into a plurality of sub-laser beams; and a focusing lens spaced apart from the second lens unit in the first direction, and which focuses the sub-laser beams passing through the second lens unit on a substrate, A first chromatic aberration by the beam splitter is compensated by a second chromatic aberration by a combination of the first lens unit and the second lens unit.

In an embodiment, an Abbe number of the second lens unit may satisfy Equation 5 below:

$$0.8 \frac{1}{v_2} < \frac{\delta\lambda_{abbe}}{\lambda_0}\left(1 - \frac{f_{eff2}}{L-d}\right) < 1.2\frac{1}{v_2}. \qquad \text{[Equation 5]}$$

In Equation 5, $V_2$ is the Abbe number of the second lens unit, $\delta\lambda_{abbe}$ is a wavelength width of the broadband laser beam, $\lambda_0$ is a center wavelength of the broadband laser beam, $f_{eff2}$ is the effective focal length of the second lens unit, L is a length between the first lens unit and the second lens unit, and d is a length between the first lens unit and the beam splitter.

In an embodiment, an Abbe number of the first lens unit may satisfy Equation 6 below:

$$-\frac{f_{eff2}}{f_{eff1}}\frac{1}{v_2} < \frac{1}{v_1} < \frac{f_{eff2}}{f_{eff1}}\frac{1}{v_2}. \qquad \text{[Equation 6]}$$

In Equation 6, $V_1$ is the Abbe number of the first lens unit, $V_2$ is an Abbe number of the second lens unit, $f_{eff1}$ is an effective focal length of the first lens unit, and $f_{eff2}$ is an effective focal length of the second lens unit.

In a display device according to embodiments of the present disclosure, the laser machining device may include a broadband light source and a beam splitting optical system. The beam splitting optical system may include a beam expander including a first lens unit and a second lens unit, a beam splitter disposed between the first lens unit and the second lens unit, and a focusing lens. The laser machining device may adjust the pitch between the sub-laser beams focused on the substrate by changing the position of the beam splitter in a fixed state of the first lens unit and the second lens unit. Therefore, the processing quality of the laser machining device may be effectively improved. In addition, the configuration of the laser machining device may be simplified, and equipment cost may be reduced.

Also, the Abbe number of each of the first lens unit and the second lens unit may be determined as an optimal value capable of compensating for the first chromatic aberration by the beam splitter. Accordingly, it may be possible to prevent or reduce spot blur defects of the sub-laser beams. Accordingly, the processing quality of the laser machining device may be effectively improved.

BRIEF DESCRIPTION OF THE DRAWINGS

FIG. 2 is a view showing a beam splitting optical system included in the laser machining device of FIG. 1.

DETAILED DESCRIPTION

Figure 1:
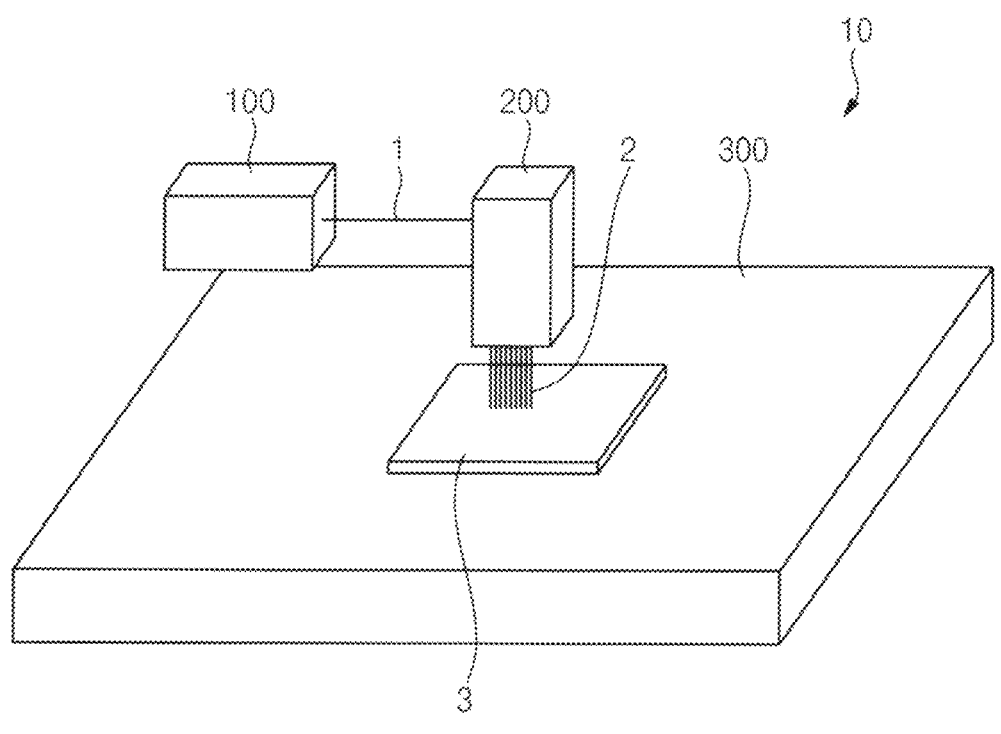
FIG. 1 is a view schematically showing a laser machining device according to an embodiment of the present disclosure.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Hereinafter, display devices in accordance with embodiments will be described in more detail with reference to the accompanying drawings. The same reference numerals are used for the same components in the drawings, and redundant descriptions of the same components will be omitted.

FIG. 1 is a view schematically showing a laser machining device according to an embodiment of the present disclosure.

Referring to FIG. 1, a laser machining device 10 according to an embodiment of the present disclosure may include a broadband light source 100 for generating a broadband laser beam 1 and a beam splitting optical system 200 to split the broadband laser beam 1 into a plurality of sub-laser beams 2, and a stage 300 on which the substrate 3, which is a processing object, is seated.

The broadband light source 100 may generate the broadband laser beam 1. The broadband laser beam 1 may be a femto second laser or a pico second laser. Accordingly, heat transfer and thermal deformation from a laser processing area to around the laser processing area of the substrate 3 may be minimized. Therefore, a precision of laser processing may be improved.

In an embodiment, a bandwidth of the broadband laser beam 1 generated by the broadband light source 100 may be greater than about 0.1 nanometers (nm). In an embodiment, a central wavelength of the broadband laser beam 1 may be greater than about 0.193 μm and less than about 10.6 μm.

The beam splitting optical system 200 may irradiate the plurality of sub-laser beams 2 to the substrate 3 by splitting the broadband laser beam 1 generated by the broadband light source 100 into the plurality of sub-laser beams 2.

The substrate 3 may be seated on the stage 300. The substrate 3 may be a processing object of the laser machining device 10 and may be any kind of the substrate included in such as an organic light emitting diode display using an organic light emitting diode including an organic light emitting layer, a micro light emitting diode using a micro LED, a quantum dot light emitting device using a quantum dot light emitting diode including a quantum dot light emitting layer, or an inorganic light emitting device using an inorganic light emitting diode including an inorganic semiconductor.

In an embodiment, the laser machining device 10 may further include a moving unit for adjusting a position of the substrate 3 seated on the stage 300.

Figure 2:
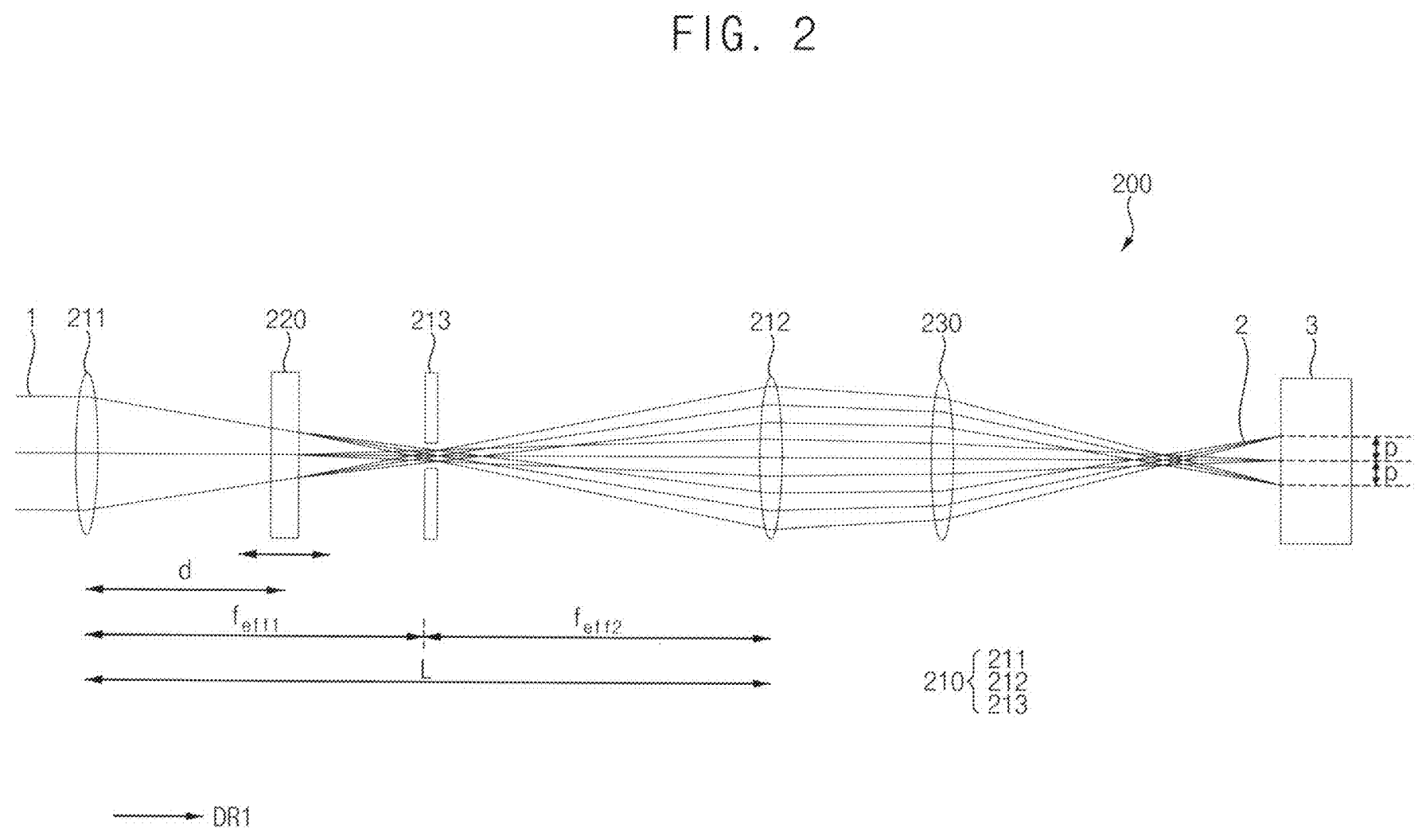

FIG. 2 is a view showing a beam splitting optical system 200 included in the laser machining device 10 of FIG. 1.

Referring to FIGS. 1 and 2, according to an embodiment, the beam splitting optical system 200 may include a beam expander 210, a beam splitter 220, and a focusing lens 230.

The beam expander 210 may adjust the size, intensity, and degree of divergence of the broadband laser beam 1 generated by the broadband light source 100. In an embodiment, the beam expander 210 may include a first lens unit 211 and a second lens unit 212.

The first lens unit 211 may have positive refractive power. The first lens unit 211 may have a first effective focal length $f_{eff1}$. The broadband laser beam 1 generated by the broadband light source 100 may be incident to the first lens unit 211.

In an embodiment, the broadband laser beam 1 incident to the first lens unit 211 may be a focused beam. For example, a condensing lens may be disposed between the broadband light source 100 and the first lens unit 211.

The second lens unit 212 may be spaced apart from the first lens unit 211 in the first direction DR1. The second lens unit 212 may have positive refractive power. The second lens unit 212 may have a second effective focal length $f_{eff2}$.

In an embodiment, each of the first lens unit 211 and the second lens unit 212 may be fixed in the beam splitting optical system 200. That is, positions of each of the first lens unit 211 and the second lens unit 212 in the first direction DR1 may be fixed. In other words, a length L (hereinafter, a first distance L) in the first direction DR1 between the first lens unit 211 and the second lens unit 212 may be maintained constant.

In an embodiment, the first distance L may satisfy Equation 1 below.

$$0.9L < f_{eff1} + f_{eff2} < 1.1L. \qquad \text{[Equation 1]}$$

Preferably, the first distance L may satisfy Equation 2 below.

$$L = f_{eff1} + f_{eff2}. \qquad \text{[Equation 2]}$$

The beam splitter 220 may be disposed between the first lens unit 211 and the second lens unit 212. The beam splitter 220 may split the broadband laser beam 1 passing through the first lens unit 211 into the plurality of sub-laser beams 2. The beam splitter 220 may be a diffractive optical element ("DOE"). The sub-laser beams 2 split by the beam splitter 220 may have substantially uniform intensity.

In an embodiment, the beam splitter 220 may be a 1×N type beam splitter. In another embodiment, the beam splitter 220 may be an N×N type beam splitter.

In an embodiment, the beam splitter 220 may be movable in the first direction DR1 and a direction opposite to the first direction DR1 within the first effective focal length $f_{eff1}$ from the first lens unit 211. That is, a length d (hereinafter, a second distance d) in the first direction DR1 between the first lens unit 211 and the beam splitter 220 may be changed within a range less than the first effective focal length $f_{eff1}$. That is, the second distance d may be greater than 0 and less than the first effective focal length $f_{eff1}$.

In an embodiment, the beam expander 210 may further include a spatial filter 213 disposed between the first lens unit 211 and the second lens unit 212. For example, the spatial filter 213 may be spaced apart from the first lens unit 211 by the first effective focal length $f_{eff1}$ in the first direction DR1. That is, the spatial filter 213 may be disposed between the beam splitter 220 and the second lens unit 212. The spatial filter 213 may have a hole formed in a focal plane of the first lens unit 211. The spatial filter 213 may remove parasitic beams derived from the beam splitter 220.

The focusing lens 230 may be spaced apart from the second lens unit 212 in the first direction DR1. The focusing lens 230 may focus the sub-laser beams 2 passing through the second lens unit 212 on the substrate 3. The focusing lens 230 may be an achromatic lens.

In an embodiment, a pitch p between the sub-laser beams 2 focused on the substrate 3 may satisfy Equation 3 below.

$$p = f\alpha\left(\frac{L-d}{f_{eff2}} - 1\right). \qquad \text{[Equation 3]}$$

In Equation 3, f is the focal length of the focusing lens 230, and α is a separation angle of the beam splitter 220.

Referring to Equation 3 above, the pitch p between the sub-laser beams 2 focused on the substrate 3 may be adjusted according to the movement of the beam splitter 220 in the first direction DR1 or the direction opposite to the first direction DR1 (i.e., as the second distance d is changed). For example, as the second distance d increases (i.e., as the beam splitter 220 moves away from the first lens unit 211), the pitch p may decrease, and as the second distance d decreases (i.e., as the beam splitter 220 approaches the first lens unit 211), the pitch p may increase.

Figure 3:
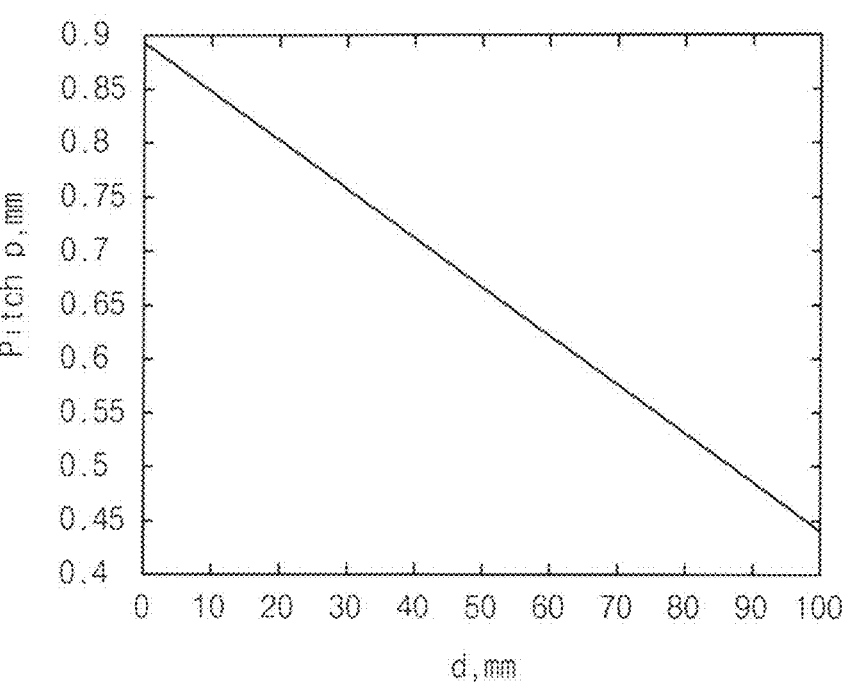
FIG. 3 is a graph for explaining a relationship between a second distance and a pitch according to an embodiment of the present disclosure.

FIG. 3 is a graph for explaining a relationship between a second distance and a pitch according to an embodiment of the present disclosure.

Specifically, FIG. 3 is a graph of the pitch p between the sub-laser beams 2 focused on the substrate 3 versus the second distance d between the first lens unit 211 and the beam splitter 220 within a range from 0 millimeter (mm) to 100 mm (i.e., by changing the position of the beam splitter 220 in the direction DR1). Here, the first distance L between the first lens unit 211 and the second lens unit 212 was fixed to 400 mm, and the second effective focal length $f_{eff2}$ of the second lens unit 212 was set to 200 mm, the separation angle of the beam splitter 220 was set to 0.3 degrees, and the focal length of the focusing lens 230 was set to 170 mm.

Referring to Equation 3 and FIG. 3, it may be seen that the pitch p is adjustable by changing the second distance d. That is, the laser machining device 10 may adjust the pitch p between the sub-laser beams 2 by changing the position of the beam splitter 220 in the first direction DR1 in a fixed state of the first lens unit 211 and the second lens unit 212. Accordingly, even when the broadband laser beam 1 generated by the broadband light source 100 is a broadband laser beam such as a femtosecond laser, the pitch p between the sub-laser beams 2 may be effectively adjusted. Therefore, the processing quality of the laser machining device 10 may be improved. In addition, a configuration such as an expensive diffraction lens is not additionally required to adjust the pitch p between the sub-laser beams 2, so the configuration of the laser machining device 10 may be effectively simplified, and equipment cost may be reduced.

In an embodiment, a first chromatic aberration by the beam splitter 220 may be compensated by a second chromatic aberration by combination of the first lens unit 211 and the second lens unit 212. For example, an Abbe number of each of the first lens unit 211 and the second lens unit 212 may be determined as an optimal value capable of compensating for the first chromatic aberration by the beam splitter 220.

In an embodiment, the optimal value of the Abbe number of the second lens unit 212 to compensate for the first chromatic aberration by the beam splitter 220 may be determined based on the wavelength width of the broadband laser beam 1, the center wavelength of the broadband laser beam 1, the first distance L, the second distance d, and the second effective focal length $f_{eff2}$.

In an embodiment, the optimal value of the Abbe number of the second lens unit 212 to compensate for the first chromatic aberration by the beam splitter 220 may satisfy Equation 4 below.

$$0.8 \frac{1}{v_2} < \frac{\delta \lambda_{abbe}}{\lambda_0} \left( 1 - \frac{f_{eff2}}{L-d} \right) < 1.2 \frac{1}{v_2}. \qquad \text{[Equation 4]}$$

Preferably, the optimal value of the Abbe number of the second lens unit 212 to compensate for the first chromatic aberration by the beam splitter 220 may satisfy Equation 5 below.

$$\frac{1}{v_2} = \frac{\delta \lambda_{abbe}}{\lambda_0} \left( 1 - \frac{f_{eff2}}{L-d} \right). \qquad \text{[Equation 5]}$$

In Equations 4 and 5, $V_2$ is the Abbe number of the second lens unit 212, $\delta \lambda_{abbe}$ is the wavelength width of the broadband laser beam 1, and $\lambda_0$ is the center wavelength of the broadband laser beam 1.

Referring to Equations 4 and 5, the optimal value of the Abbe number of the second lens unit 212 to compensate for the first chromatic aberration by the beam splitter 220 may be determined based on the wavelength width of the laser beam 1, the center wavelength of the broadband laser beam 1, the first distance L, the second distance d, and the second effective focal length $f_{eff2}$.

Figure 4:
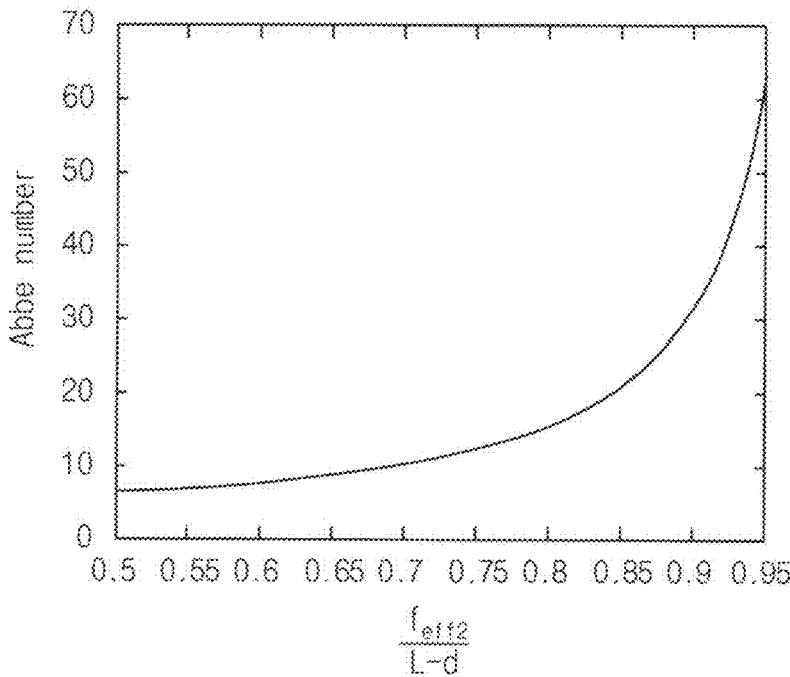
FIG. 4 is a graph for explaining an optimal value of the Abbe number of the second lens unit 212 according to an embodiment of the present disclosure.

FIG. 4 is a graph for explaining an optimal value of the Abbe number of the second lens unit 212 according to an embodiment of the present disclosure.

Specifically, FIG. 4 is a graph showing a relationship between a ratio of the second effective focal length $f_{eff2}$ of the second lens unit 212 to the distance L-d between the beam splitter 220 and the second lens unit 212 (hereinafter, a first ratio) and the optimal value of the Abbe number of the second lens unit 212. That is, FIG. 4 is a graph of the optimal value of the Abbe number of the second lens unit 212 versus the first ratio $f_{eff2}/(L-d)$. Here, the first distance L between the first lens unit 211 and the second lens unit 212 was fixed to 400 mm, and the second effective focal length $f_{eff2}$ of the second lens unit 212 was set to 200 mm, the wavelength width of the broadband laser beam 1 was set to 163 nm (=643 nm–480 nm), and the center wavelength was set to 515 nm.

Referring to FIG. 4, it may be seen that as the first ratio increases (i.e., as the beam splitter 220 moves away from the first lens unit 211), the optimal value of the Abbe number of the second lens unit 212 increases, and as the first ratio decreases (i.e., as the beam splitter 220 approaches the first lens unit 211), the optimal value of the Abbe number of the second lens unit 212 decreases. Specifically, it may be seen that when the first ratio is greater than about 0.85, the optimal value of the Abbe number of the second lens unit 212 is greater than about 20, and when the first ratio is less than about 0.85, the optimal value of the Abbe number of the second lens unit 212 is less than about 20.

In an embodiment, the second lens unit 212 may include one lens having a positive refractive power. For example, when the optimal value of the Abbe number of the second lens unit 212 to compensate for the first chromatic aberration by the beam splitter 220 is greater than about 20, the second lens unit 212 may include one lens having the Abbe number of the optimal value.

In another embodiment, the second lens unit 212 may include a plurality of lenses having different refractive powers and Abbe numbers. For example, when the optimal value of the Abbe number of the second lens unit 212 to compensate for the first chromatic aberration by the beam splitter 220 is less than or equal to about 20, the second lens unit 212 may include a plurality of lenses having different refractive powers and Abbe numbers. In an embodiment, for example, the second lens unit 212 may include a first lens having a negative refractive power and a second lens having a positive refractive power. An Abbe number of the first lens may be greater than the Abbe number of the entire second lens unit 212. However, this is exemplary and the present disclosure is not limited thereto.

Figure 5:
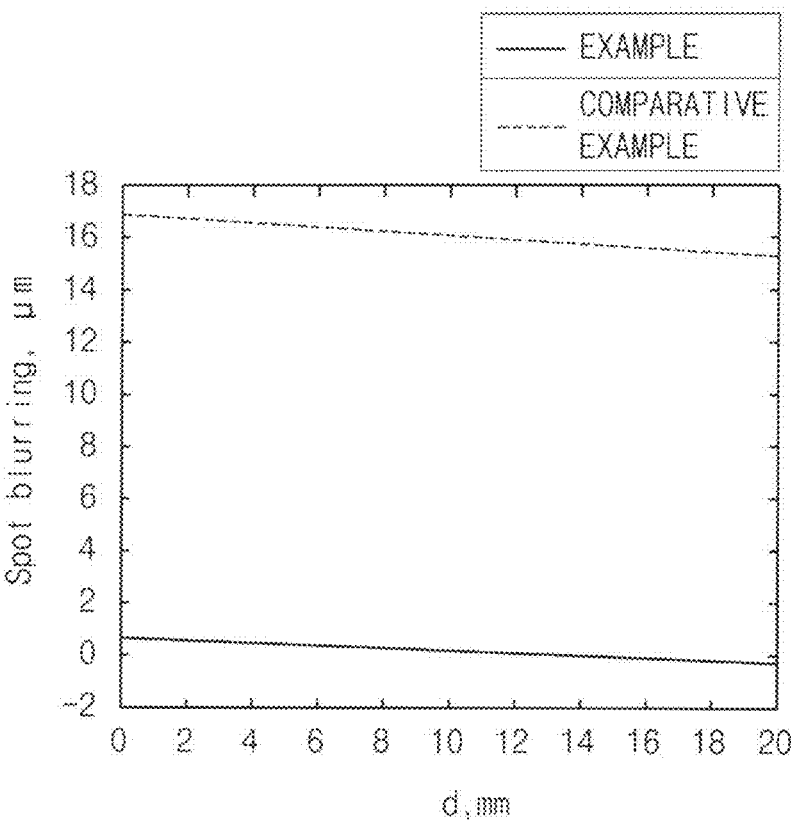
FIG. 5 is a graph showing spot blur of comparative example and example.

FIG. 5 is a graph showing spot blur of comparative example and example.

FIG. 5 is a graph for spot blur defect of the sub-laser beams 2 in a comparative example in which the Abbe number of the second lens unit is not optimized, and an example in which the Abbe number of the second lens unit 212 is optimized to compensate for the first chromatic aberration by the beam splitter 220. Specifically, the spot blur defect of the sub-laser beams 2 focused on the substrate 3 was measured by changing the second distance d between the first lens unit 211 and the beam splitter 220 within a range from 0 mm to 20 mm (i.e., by changing the position of the beam splitter 220 in the first direction DR1). Here, the first distance L between the first lens unit 211 and the second lens unit 212 was fixed to 400 mm, and the wavelength width of the broadband laser beam 1 was set to 163 nm (=643 nm–480 nm), the central wavelength was set to 515 nm, the second effective focal length fern of the second lens unit 212 was set to 200 mm, the separation angle of the beam splitter 220 was set to 0.3 degrees, and the focus distance of the focusing lens 230 was set to 170 mm, and the Abbe number of the second lens unit 212 was set to have an optimal value (about 6.5) calculated based on the second distance d of 10 mm.

Referring to FIG. 5, in the comparative example in which the Abbe number of the second lens unit 212 is not optimized, it may be seen that the spot blur defect of the sub-laser beams 2 appears as large as about 17 μm in the entire variable range (0 mm to 20 mm) of the second distance d. In contrast, in the example according to the invention in which the Abbe number of the second lens unit 212 is optimized to compensate for the chromatic aberration by the beam splitter 220, it may be seen that the spot blur of the sub-laser beams appears as small as less than about 1 μm in the entire variable range (0 mm to 20 mm) of the second distance d. Accordingly, it may be seen that by optimizing the Abbe number of the second lens unit 212 to compensate for the chromatic aberration by the beam splitter 220, it may be possible to prevent or reduce the spot blur defect of the sub-laser beams 2. Therefore, the processing quality of the laser machining device 10 may be effectively improved.

In an embodiment, the optimal value of the Abbe number of the first lens unit 211 to compensate for the first chromatic aberration by the beam splitter 220 may be determined based on the Abbe number of the second lens unit 212, the first effective focal length $f_{eff1}$ and the second effective focal length $f_{eff2}$.

In an embodiment, the optimal value of the Abbe number of the first lens unit 211 to compensate for the first chromatic aberration by the beam splitter 220 may satisfy Equation 6 below.

$$-\frac{f_{eff2}}{f_{eff1}}\frac{1}{v_2} < \frac{1}{v_1} < \frac{f_{eff2}}{f_{eff1}}\frac{1}{v_2}. \qquad \text{[Equation 6]}$$

Preferably, the optimal value of the Abbe number of the first lens unit 211 to compensate for the first chromatic aberration by the beam splitter 220 may satisfy Equation 7 below.

$$\frac{1}{v_1} = -\frac{f_{eff2}}{f_{eff1}}\frac{1}{v_2}. \qquad \text{[Equation 7]}$$

In Equations 6 and 7, $V_1$ is the Abbe number of the first lens unit 211.

Referring to Equations 6 and 7, the optimal value of the Abbe number of the first lens unit 211 to compensate for the first chromatic aberration by the beam splitter 220 may be determined based on the Abbe number of the second lens unit 212, the first effective focal length $f_{eff1}$, and the second effective focal length $f_{eff2}$.

In an embodiment, the first lens unit 211 may include one lens having positive refractive power. For example, the first lens unit 211 may include one lens having positive refractive power and having an Abbe number greater than about 60. However, this is exemplary and the present disclosure is not limited thereto.

According to embodiments of the present disclosure, the laser machining device 10 may include the broadband light source 100 and the beam splitting optical system 200. The beam splitting optical system 200 may include the beam expander 210 including the first lens unit 211 and the second lens unit 212, the beam splitter 220 disposed between the first lens unit 211 and the second lens unit 212, and the focusing lens 230. The laser machining device 10 may adjust the pitch p between the sub-laser beams 2 by changing the position of the beam splitter 220 in the fixed state of the first lens unit 211 and the second lens unit 212. Therefore, the processing quality of the laser machining device 10, au be improved. In addition, a configuration such as an expensive diffraction lens may not additionally required to adjust the pitch p between the sub-laser beams 2, so the configuration of the laser machining device 10 may be effectively simplified, and the equipment cost may be reduced.

Also, the Abbe number of each of the first lens unit 211 and the second lens unit 212 may be determined as an optimal value capable of compensating for the chromatic aberration by the beam splitter 220. Accordingly, it may be possible to prevent or reduce the spot blur defect of the sub-laser beams 2. Accordingly, the processing quality of the laser machining device 10 may be effectively improved.

The devices according to the embodiments may be applied to a display device included in a computer, a notebook, a mobile phone, a smartphone, a smart pad, a PMP, a PDA, an MP3 player, or the like.

Although the devices according to the embodiments have been described with reference to the drawings, the illustrated embodiments are examples, and may be modified and changed by a person having ordinary knowledge in the relevant technical field without departing from the technical spirit described in the following claims.

What is claimed is:

1. A laser machining device comprising:
a broadband light source, which generates a broadband laser beam;
a first lens unit to which the broadband laser beam is incident and having a first effective focal length;
a second lens unit spaced apart from the first lens unit in a first direction and having a second effective focal length;
a beam splitter disposed between the first lens unit and the second lens unit, and which is movable in the first direction and a direction opposite to the first direction within the first effective focal length from the first lens unit, and splits the broadband laser beam passing through the first lens unit into a plurality of sub-laser beams;
a focusing lens spaced apart from the second lens unit in the first direction, and which focuses the sub-laser beams passing through the second lens unit on a substrate; and
wherein a first chromatic aberration by the beam splitter is compensated by a second chromatic aberration by a combination of the first lens unit and the second lens unit.

2. The laser machining device of claim 1, wherein a location of each of the first lens unit and the second lens unit is fixed.

3. The laser machining device of claim 1, wherein a length between the first lens unit and the second lens unit satisfies Equation 1 below:

$$0.9L < f_{eff1} + f_{eff2} < 1.1L, \qquad \text{Equation 1}$$

in Equation 1, L is the length between the first lens unit and the second lens unit, $f_{eff1}$ is the first effective focal length, and $f_{eff2}$ is the second effective focal length.

4. The laser machining device of claim 1, wherein a pitch between the sub-laser beams focused on the substrate is adjusted according to movement of the beam splitter in the first direction or the direction opposite to the first direction.

5. The laser machining device of claim 4, wherein the pitch satisfies Equation 2 below:

$$p = f\alpha\left(\frac{L-d}{f_{eff2}} - 1\right), \qquad \text{Equation 2}$$

in Equation 2, p is the pitch, f is the focal length of the focusing lens, $\alpha$ is a separation angle of the beam splitter, L is the length between the first lens unit and the second lens unit, and d is a distance between the first lens unit and the beam splitter, and $f_{eff2}$ is the second effective focal length.

6. The laser machining device of claim 1, wherein an Abbe number of the second lens unit satisfies Equation 3 below:

$$0.8\frac{1}{v_2} < \frac{\delta\lambda_{abbe}}{\lambda_0}\left(1 - \frac{f_{eff2}}{L-d}\right) < 1.2\frac{1}{v_2}, \qquad \text{Equation 3}$$

in Equation 3, $V_2$ is the Abbe number of the second lens unit, $\delta\lambda_{abbe}$ is a wavelength width of the broadband laser beam, Ao is a center wavelength of the broadband laser beam, $f_{eff2}$ is the second effective focal length, and L is the length between the first lens unit and the second lens unit, and d is the length between the first lens unit and the beam splitter.

7. The laser machining device of claim 1, wherein an Abbe number of the first lens unit satisfies Equation 4 below:

$$-\frac{f_{eff2}}{f_{eff1}}\frac{1}{v_2} < \frac{1}{v_1} < \frac{f_{eff2}}{f_{eff1}}\frac{1}{v_2}, \qquad \text{Equation 4}$$

in Equation 4, $V_1$ is the Abbe number of the first lens unit, $V_2$ is the Abbe number of the second lens unit, $f_{eff1}$ is the first effective focal length, and $f_{eff2}$ is the second effective focal length.

8. The laser machining device of claim 1, wherein the first lens unit includes one lens having an Abbe number greater than 60.

9. The laser machining device of claim 1, wherein the second lens unit includes one lens having an Abbe number greater than 20.

10. The laser machining device of claim 1, wherein the second lens unit includes a first lens having a negative refractive power and a second lens having a positive refractive power, and an Abbe number of the first lens is greater than an Abbe number of the second lens unit.

11. The laser machining device of claim 1, further comprising:

a spatial filter disposed between the beam splitter and the second lens unit and having a hole formed in a focal plane of the first lens unit.

12. The laser machining device of claim 1, wherein the broadband laser beam is a femtosecond laser or a picosecond laser.

13. The laser machining device of claim 1, wherein a bandwidth of the broadband laser beam is greater than 0.1 nanometers (nm).

14. The laser machining device of claim 1, wherein a center wavelength of the broadband laser beam is greater than 0.193 micrometers ($\mu$m) and less than about-10.6 $\mu$m.

15. The laser machining device of claim 1, wherein the beam splitter is a 1×N type beam splitter or an N×N type beam splitter, and the sub-laser beams splitted by the beam splitter have a uniform intensity.

16. The laser machining device of claim 1, wherein the broadband laser beam incident to the first lens unit is a focused beam.

17. A laser machining device comprising:

a broadband light source, which generates a broadband laser beam;

a first lens unit to which the broadband laser beam is incident;

a second lens unit spaced apart from the first lens unit in a first direction;

a beam splitter disposed between the first lens unit and the second lens unit, and which splits the broadband laser beam passing through the first lens unit into a plurality of sub-laser beams; and a focusing lens spaced apart from the second lens unit in the first direction, and which focuses the sub-laser beams passing through the second lens unit on a substrate, wherein a first chromatic aberration by the beam splitter is compensated by a second chromatic aberration by a combination of the first lens unit and the second lens unit.

18. The laser machining device of claim 17, wherein an Abbe number of the second lens unit satisfies Equation 5 below:

$$0.8\frac{1}{v_2} < \frac{\delta\lambda_{abbe}}{\lambda_0}\left(1 - \frac{f_{eff2}}{L-d}\right) < 1.2\frac{1}{v_2}, \qquad \text{Equation 5}$$

in Equation 5, $V_2$ is the Abbe number of the second lens unit, $\delta\lambda_{abbe}$ is a wavelength width of the broadband laser beam, $\lambda_0$ is a center wavelength of the broadband laser beam, $f_{eff2}$ is the effective focal length of the second lens unit, L is a length between the first lens unit and the second lens unit, and d is a length between the first lens unit and the beam splitter.

19. The laser machining device of claim 17, wherein an Abbe number of the first lens unit satisfies Equation 6 below:

$$-\frac{f_{eff2}}{f_{eff1}}\frac{1}{v_2} < \frac{1}{v_1} < \frac{f_{eff2}}{f_{eff1}}\frac{1}{v_2}, \qquad \text{Equation 6}$$

in Equation 6, $V_1$ is the Abbe number of the first lens unit, $V_2$ is an Abbe number of the second lens unit, $f_{eff1}$ is an effective focal length of the first lens unit, and $f_{eff2}$ is an effective focal length of the second lens unit.

* * * * *